(12) United States Patent
Lu et al.

(10) Patent No.: US 12,457,675 B2
(45) Date of Patent: Oct. 28, 2025

(54) LIGHTING DEVICE HAVING TRANSIENT CURRENT SUPPRESSING FUNCTION

(71) Applicant: Xiamen PVTECH Co., Ltd., Fujian (CN)

(72) Inventors: Fuxing Lu, Fujian (CN); Zhirong Lin, Fujian (CN)

(73) Assignee: Xiamen PVTECH Co., Ltd., Xiamen (CN)

( * ) Notice: Subject to any disclaimer, the term of this patent is extended or adjusted under 35 U.S.C. 154(b) by 98 days.

(21) Appl. No.: 18/398,171

(22) Filed: Dec. 28, 2023

(65) Prior Publication Data

US 2025/0008632 A1    Jan. 2, 2025

(30) Foreign Application Priority Data

Jun. 29, 2023   (CN) .......................... 202310782418.1

(51) Int. Cl.
*H05B 47/20*    (2020.01)

(52) U.S. Cl.
CPC .................. *H05B 47/20* (2020.01)

(58) Field of Classification Search
CPC ........ H05B 45/00; H05B 45/36; H05B 45/50; H05B 47/20; H05B 47/24; H05B 47/25; H02M 1/12; H02M 1/123; H02M 1/26; H02M 1/32; H02M 7/125
See application file for complete search history.

(56) References Cited

U.S. PATENT DOCUMENTS

| | | | |
|---|---|---|---|
| 11,602,031 B2 * | 3/2023 | Zhou | H05B 45/54 |
| 2010/0046256 A1 | 2/2010 | Kanno | |
| 2012/0248986 A1 * | 10/2012 | Gibbs | H05B 45/395 |
| | | | 315/122 |
| 2015/0312987 A1 * | 10/2015 | Gibbs | H05B 45/345 |
| | | | 315/122 |
| 2020/0404762 A1 * | 12/2020 | Stack | H02M 1/32 |

FOREIGN PATENT DOCUMENTS

WO    2021/248266 A1    12/2021

* cited by examiner

*Primary Examiner* — Thai Pham
(74) *Attorney, Agent, or Firm* — Bruce Stone LLP; Joseph A. Bruce (57) ABSTRACT

A lighting device includes a rectifying circuit, first filtering capacitor, resistor element, transient current suppressing circuit and voltage divider circuit. The two ends of the first filtering capacitor are connected to a first node and second node respectively. The two ends of the resistor element are connected to the second node and third node respectively. The transient current suppressing circuit includes a switch and first adjusting capacitor. The three ends of the switch are connected to a fourth node, second node and third node respectively. The two ends of the first adjusting capacitor are connected to the second node and fourth node respectively. The two ends of the voltage divider circuit are connected to the first node and fourth node respectively. The first node, third node and second node are connected to the first and second output ends of the rectifying circuit and grounding point respectively.

9 Claims, 5 Drawing Sheets

LIGHTING DEVICE HAVING TRANSIENT CURRENT SUPPRESSING FUNCTION

BACKGROUND OF THE INVENTION

1. Field of the Invention

The present invention relates to a lighting device, in particular to a lighting device having transient current suppressing function.

2. Description of the Prior Art

Many factories require a large number of high-power lighting devices, such as tri-proof lights, panel lights, mining lights, etc. In order to reduce wiring complexity and the number of control switches, it is necessary to use a serial circuit including one or more air-circuit breakers and multiple lighting devices connected in series. However, due to the high transient current generated when the air-circuit breaker is turned on, the number of lighting devices in the serial circuit needs to be reduced, such that the effectiveness of the air-circuit breaker cannot be maximized. For instance, if an air-circuit breaker (such as C16) can support 16 lighting devices, the high transient current in the serial circuit of 16 lighting devices may cause the air-circuit breaker to trip (when the current passes through the air-circuit breaker exceeds the rated value thereof). Consequently, the air-circuit breaker can only support 10 lighting devices.

China Patent Publication No.: CN110798937A and China Patent Publication No.: CN114980415A disclose technologies related to suppressing transient currents, but these technologies still cannot effectively solve the above problems.

SUMMARY OF THE INVENTION

One embodiment of the present invention provides a lighting device having transient current suppressing function, which includes a rectifying circuit, a first filtering capacitor, a resistor element, a transient current suppressing circuit and a voltage divider circuit. One end of the first filtering capacitor is connected to a first node and the first node is connected to the first output end of the rectifying circuit. The other end of the first filtering capacitor is connected to a second node and the second node is connected to a grounding point. One end of the resistor element is connected to the second node and the other end of the resistor element is connected to a third node. The third node is connected to the second output end of the rectifying circuit. The transient current suppressing circuit includes a switch and a first adjusting capacitor. The first end of the switch is connected to a fourth node. The second end of the switch is connected to the second node. The third end of the switch is connected to the third node. One end of the first adjusting capacitor is connected to the second node and the other end of the first adjusting capacitor is connected to the fourth node. One end of the voltage divider circuit is connected to the first node and the other end of the voltage divider circuit is connected to the fourth node.

In one embodiment of the present invention, the capacitance of the first adjusting capacitor is related to the turn-on delay time of the switch.

In one embodiment of the present invention, the switch enters the off state at the moment of the rectifying circuit being connected to an external power source so as to suppress the transient current. The switch returns to the on state after the transient current is suppressed.

In one embodiment of the present invention, the transient current suppressing circuit further includes a Zener diode. One end of the Zener diode is connected to the second node and the other end of the Zener diode is connected to the fourth node.

In one embodiment of the present invention, the lighting device further includes an auxiliary resistor. One end of the resistor element is connected to the second node via the auxiliary resistor.

In one embodiment of the present invention, the voltage divider circuit includes a first resistor group and a second resistor group. One end of the first resistor group is connected to the first node. The other end of the first resistor group is connected to the fourth node and the second resistor group.

In one embodiment of the present invention, the voltage divider circuit further includes a second adjusting capacitor and a fifth resistor. The second adjusting capacitor is connected to the second resistor group in parallel. The other end of the first resistor group is connected to the fourth node via the fifth resistor.

In one embodiment of the present invention, the capacitance of the second adjusting capacitor is related to the turn-on delay time of the switch.

The lighting device having transient current suppressing function in accordance with the embodiments of the present invention may have the following advantages:

(1) In one embodiment of the present invention, the lighting device having transient current suppressing function, which includes a rectifying circuit, a first filtering capacitor, a resistor element, a transient current suppressing circuit and a voltage divider circuit. One end of the first filtering capacitor is connected to a first node and the first node is connected to the first output end of the rectifying circuit. The other end of the first filtering capacitor is connected to a second node and the second node is connected to a grounding point. One end of the resistor element is connected to the second node and the other end of the resistor element is connected to a third node. The third node is connected to the second output end of the rectifying circuit. The transient current suppressing circuit includes a switch and a first adjusting capacitor. The first end of the switch is connected to a fourth node. The second end of the switch is connected to the second node. The third end of the switch is connected to the third node. One end of the first adjusting capacitor is connected to the second node and the other end of the first adjusting capacitor is connected to the fourth node. One end of the voltage divider circuit is connected to the first node and the other end of the voltage divider circuit is connected to the fourth node. The above transient current suppressing circuit operates by momentarily keeping the switch in the off state when the lighting device is connected to an external power source (air-circuit breaker is turned on). In this way, the resistor element can limit the current supplied to other circuit components in the lighting device. Thus, the transient current suppressing circuit can effectively achieve the transient current suppressing function. Once the transient current is effectively suppressed, the transient current suppressing circuit can control the switch to return to the on state and make the resistor element be in a short-circuit state. This ensures that the current supplied to other circuit components in the lighting device is not restricted by the resistor element. Consequently, transient currents in the lighting device can be significantly reduced, such that the air-circuit breaker can be connected in series with more lighting devices. As a result, the efficiency of the air-circuit breaker can be maximized.

(2) In one embodiment of the present invention, the voltage divider circuit of the lighting device further includes a second adjusting capacitor, and the capacitance values of the first and second adjusting capacitors are related to the switch's turn-on delay time. Therefore, the voltage divider circuit of the lighting device also incorporates an auxiliary circuit that assist in transient current suppression. By adjusting the capacitance values of the first and second adjusting capacitors, the turn-on delay time of the switch can be effectively altered, which can enhance the transient current suppressing function. The circuit of the lighting device can achieve high stability.

(3) In one embodiment of the present invention, the lighting device further includes an auxiliary resistor. One end of the resistor element connected to the second node via the auxiliary resistor. This auxiliary resistor effectively reduces the impact of environmental temperature on the resistor element, such that the resistance of the resistor element does not tend to change due to environmental factors. This circuit design further enhances the transient current suppressing function Therefore, the lighting device can be more flexible in use and conform to actual requirements.

(4) In one embodiment of the present invention, the lighting device can provide the effective transient current suppressing function and achieve high stability, such that the lighting device is applicable to various locations, such as factories, mines, and shopping malls. Consequently, the lighting device can be more comprehensively in application and satisfy different requirements.

(5) In one embodiment of the present invention, the circuit design of the lighting device is simple, so the lighting device can achieve the desired technical effects without significantly increasing the cost thereof. Therefore, the overall cost of the lighting device can be decreased, so the lighting device can achieve high practicality.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 1:
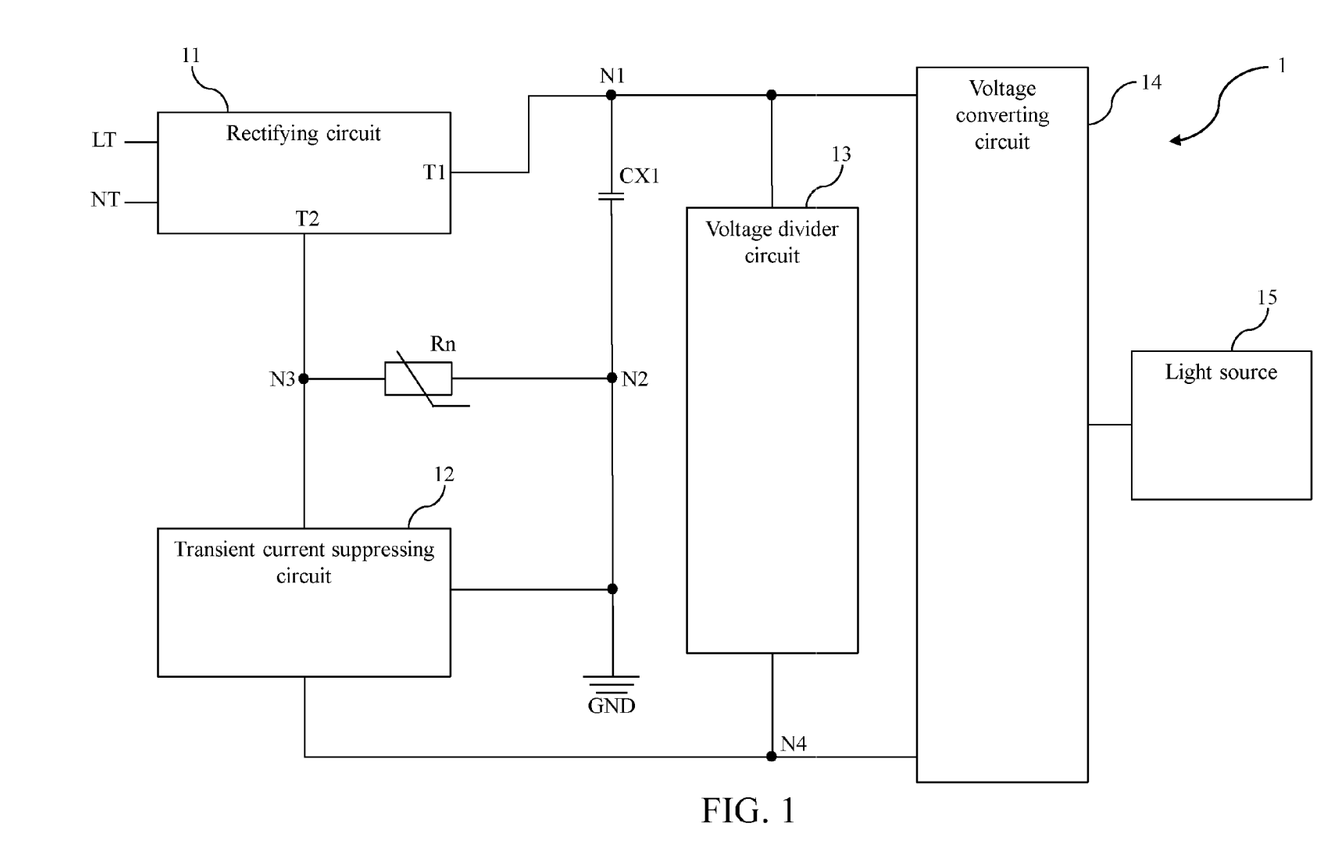
FIG. 1 is the block diagram of the circuit structure of the lighting device having transient current suppressing function in accordance with the first embodiment of the present invention.

Please refer to FIG. 1, which is the block diagram of the circuit structure of the lighting device having transient current suppressing function in accordance with the first embodiment of the present invention. As shown in FIG. 1, the lighting device 1 includes a rectifying circuit 11, a first filtering capacitor CX1, a resistor element Rn, a transient current suppressing circuit 12, a voltage divider circuit 13, a voltage converting circuit 14, and a light source 15.

The rectifying circuit 11 has a live wire terminal LT and a neutral wire terminal NT, which can be connected to an external power source (such as utility power or other AC power sources) through an air-circuit breaker. The first output end T1 of the rectifying circuit 11 is connected to a first node N1, and the second output end T2 of the rectifying circuit 11 is connected to a third node N3.

One end of the first filtering capacitor CX1 is connected to the first node N1, and the other end of the first filtering capacitor CX1 is connected to a second node N2. The second node N2 is connected to the grounding point GND.

One end of the resistor element Rn is connected to the second node N2, and the other end of the resistor element Rn is connected to the third node N3. In this embodiment, the resistor element Rn is a thermistor (such as a negative temperature coefficient thermistor). In another embodiment, the resistor element Rn can also be a cement resistor, carbon-firm resistor, or other currently available resistors.

The first end of the transient current suppressing circuit 12 is connected to the third node N3, the second end of the transient current suppressing circuit 12 is connected to the second node N2, and the third end of the transient current suppressing circuit 12 is connected to a fourth node N4.

One end of the voltage divider circuit 13 is connected to the first node N1, and the other end of the voltage divider circuit 13 is connected to the fourth node N4.

One end of the voltage converting circuit 14 is connected to the first node N1, and the other end of the voltage converting circuit 14 is connected to the fourth node N4. In this embodiment, the voltage converting circuit 14 can be a DC/DC converter, such as a boost converter, buck converter, or buck/boost converter.

The light source 15 is connected to the voltage converting circuit 14. In this embodiment, the light source 15 can be a light-emitting diode (LED), a LED array, or similar components. In another embodiment, the light source 15 can also be a fluorescent lamp, a bulb, or similar components. Via the above circuit structure, the external power source can drive the light source 15.

The embodiment just exemplifies the present invention and is not intended to limit the scope of the present invention; any equivalent modification and variation according to the spirit of the present invention is to be also included within the scope of the following claims and their equivalents.

Figure 2:
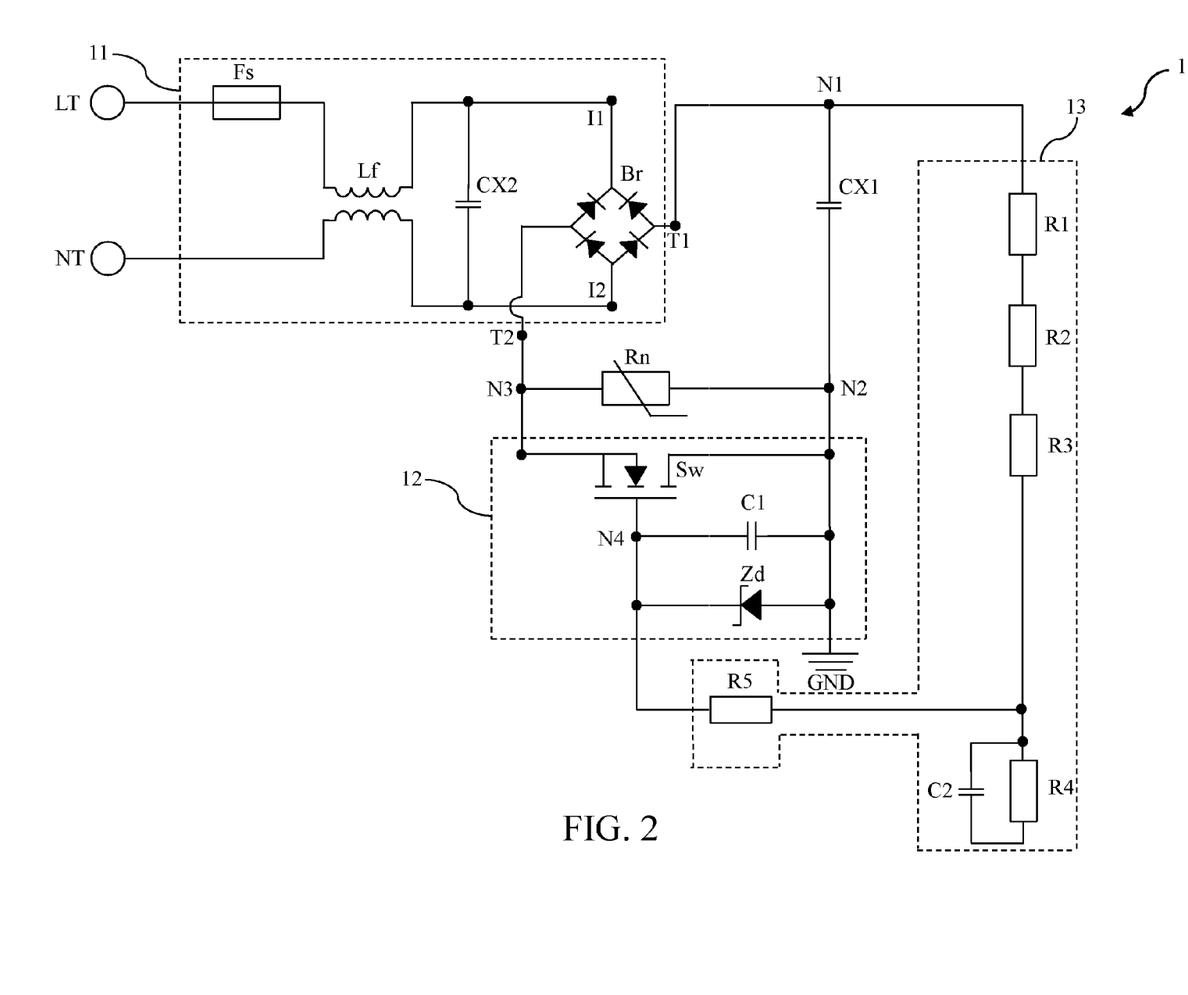
FIG. 2 is the circuit diagram of the lighting device having transient current suppressing function in accordance with the first embodiment of the present invention.

Please refer to FIG. 2, which is the circuit diagram of the lighting device having transient current suppressing function in accordance with the first embodiment of the present invention, and please also refer to FIG. 1. As shown in FIG. 1, the lighting device 1 includes the rectifying circuit 11, the first filtering capacitor CX1, the resistor element Rn, the transient current suppressing circuit 12, the voltage divider circuit 13, the voltage converting circuit 14, and the light source 15. FIG. 2 illustrates the circuit structures of the rectifying circuit 11, the transient current suppressing circuit 12, and the voltage divider circuit 13 of the lighting device 1. However, the circuit structures of the rectifying circuit 11, the transient current suppressing circuit 12, and the voltage divider circuit 13 can be changed according to actual requirements. FIG. 2 also illustrates the connection relation of the rectifying circuit 11, the first filtering capacitor CX1, the resistor element Rn, the transient current suppressing circuit 12, and the voltage divider circuit 13. As shown in FIG. 2, the rectifying circuit 11 has live wire terminal LT and neutral wire terminal NT. Besides, the rectifying circuit 11 further includes a fuse Fs, common-mode inductor Lf, second filtering capacitor CX2, and bridge rectifier Br. One input terminal of the common-mode inductor Lf is connected to the live wire terminal LT via the fuse Fs, and the other input terminal of the common-mode inductor Lf is connected to the neutral wire terminal NT. The two output terminals of the common-mode inductor Lf are respectively connected to the two ends of the second filtering capacitor CX2. The two ends of the second filtering capacitor CX2 are respectively connected to the two input terminals 11, 12 of the bridge rectifier Br. The common-mode inductor Lf can provide the isolation function to prevent the second filtering capacitor CX2 from being charged when the lighting device 1 is connected to the external power source (the air-circuit breaker is turned on), leading to the tripping of the air-circuit breaker (when the current passing through the air-circuit breaker exceeds the rated current thereof).

One end of the first filtering capacitor CX1 is connected to the first node N1, and the other end of the first filtering capacitor CX1 is connected to the second node N2. The first node N1 is connected to the first output end T1 of the rectifying circuit 11 (bridge rectifier Br), and the second node N2 is connected to the ground point GND.

One end of the resistor element Rn is connected to the second node N2, and the other end of the resistor element Rn is connected to the third node N3. The third node N3 is connected to the second output end T2 of the rectifying circuit 11 (bridge rectifier Br).

The transient current suppressing circuit 12 includes a switch Sw, a first adjusting capacitor C1, and a Zener diode Zd. The first end (gate) of the switch Sw is connected to the fourth node N4, the second end (source) of the switch Sw is connected to the second node N2, and the third end (drain) of the switch Sw is connected to the third node N3. One end of the first adjusting capacitor C1 is connected to the second node N2, and the other end of the first adjusting capacitor C1 is connected to the fourth node N4. In this embodiment, the switch Sw is a metal-oxide-semiconductor field-effect transistor (MOSFET). In another embodiment, the switch Sw can be a bipolar junction transistor (BJT) or similar components. One end of the Zener diode Zd is connected to the second node N2, and the other end of the Zener diode Zd is connected to the fourth node N4. The Zener diode Zd is used to regulate the voltage applied to the first end (gate) of the switch Sw to prevent the voltage from becoming too high.

The voltage divider circuit 13 includes a first resistor group, a second resistor group, a second adjusting capacitor C2, and a fifth resistor R5. The voltage divider circuit 13 can be used to generate the voltage applied to the first end (gate) of the switch Sw. The first resistor group can include one or more resistors. In this embodiment, the first resistor group includes a first resistor R1, second resistor R2, and third resistor R3 connected to each other in series (the number of resistors in the first resistor group can vary according to actual requirements). The second resistor group can include one or more resistors. In this embodiment, the second resistor group includes a fourth resistor R4 (the number of resistors in the second resistor group can vary according to actual requirements). One end of the first resistor group is connected to the first node N1, and the other end of the first resistor group is connected to the fourth node N4 via the fifth resistor R5 and the second resistor group. The second adjusting capacitor C2 is connected to the second resistor group (the fourth resistor R4) in parallel.

At the moment when the lighting device 1 (the rectifying circuit 11) is connected to the external power source (the air-circuit breaker is turned on), the switch Sw remains in the off state. At this time, current flows through the resistor element Rn, such that the resistor element Rn can provide the current limiting function for other circuit components of the lighting device 1. Then, after the turn-on delay time, the transient current is effectively suppressed. At this point, the switch Sw is turned on, to make the resistor element Rn enter the short circuit state, such that the current supplied to other circuit components of the lighting device 1 without being limited by the resistor element Rn. When the lighting device 1 is connected to the external power source (air-circuit breaker is turned on), the first adjusting capacitor C1 and the second adjusting capacitor C2 are charged, so the first adjusting capacitor C1 and the second adjusting capacitor C2 can provide voltage for the switch Sw so s to turn on the switch Sw.

The capacitances of the first adjusting capacitor C1 and the second adjusting capacitor C2 are related to the turn-on delay time of the switch Sw. The capacitance value of the first adjusting capacitor C1 is directly proportional to the turn-on delay time of the switch Sw, and the capacitance value of the second adjusting capacitor C2 is also directly proportional to the turn-on delay time of the switch Sw. The first adjusting capacitor C1 is included in the transient current suppressing circuit 12, and the second adjusting capacitor C2 is included in the voltage divider circuit 13. The above circuit configuration provides flexibility to the circuit design of the lighting device 1 with a view to satisfying the requirements of different applications. Therefore, by adjusting the capacitances of the first adjusting capacitor C1 and the second adjusting capacitor C2, the turn-on delay time of the switch Sw can be properly changed in order to provide the transient current suppressing function. For example, by adjusting the capacitances of the first adjusting capacitor C1 and the second adjusting capacitor C2, the turn-on delay time of the switch Sw can be set to approximately 10 ms-100 ms (the turn-on delay time of the switch Sw can be adjusted according to actual requirements); the time point of the turn-on of the switch Sw needs to be different from the time point when the first filtering capacitor CX1 is charged and generates transient current. Additionally, the resistance of the fifth resistor R5 is also related to the turn-on delay time of the switch Sw, and the turn-on delay time of the switch Sw can be changed by adjusting the resistance of the fifth resistor R5.

The above transient current suppressing circuit 12 and the operational mechanism can effectively provide the transient current suppressing function. Therefore, the transient current of the lighting device 1 can be effectively suppressed, such that the air-circuit breaker can be connected to more lighting devices 1 in series. Consequently, the effectiveness of the air-circuit breaker can be maximized. Additionally, as previously stated, the voltage divider circuit 13 also includes the second adjusting capacitor C1. The capacitances of the first adjusting capacitor C1 and the second adjusting capacitor C2 are related to the turn-on delay time of the switch. Therefore, the voltage divider circuit 12 of the lighting device 1 also serves as an auxiliary circuit that assists in the transient current suppressing function. Thus, by appropriately adjusting the capacitances of the first adjusting capacitor C1 and the second adjusting capacitor C2, the turn-on delay time of the switch Sw can be properly changed so as to provide the transient current suppressing function. Therefore, the circuit of the lighting device 1 can achieve higher stability.

The embodiment just exemplifies the present invention and is not intended to limit the scope of the present invention; any equivalent modification and variation according to the spirit of the present invention is to be also included within the scope of the following claims and their equivalents.

Figure 3:
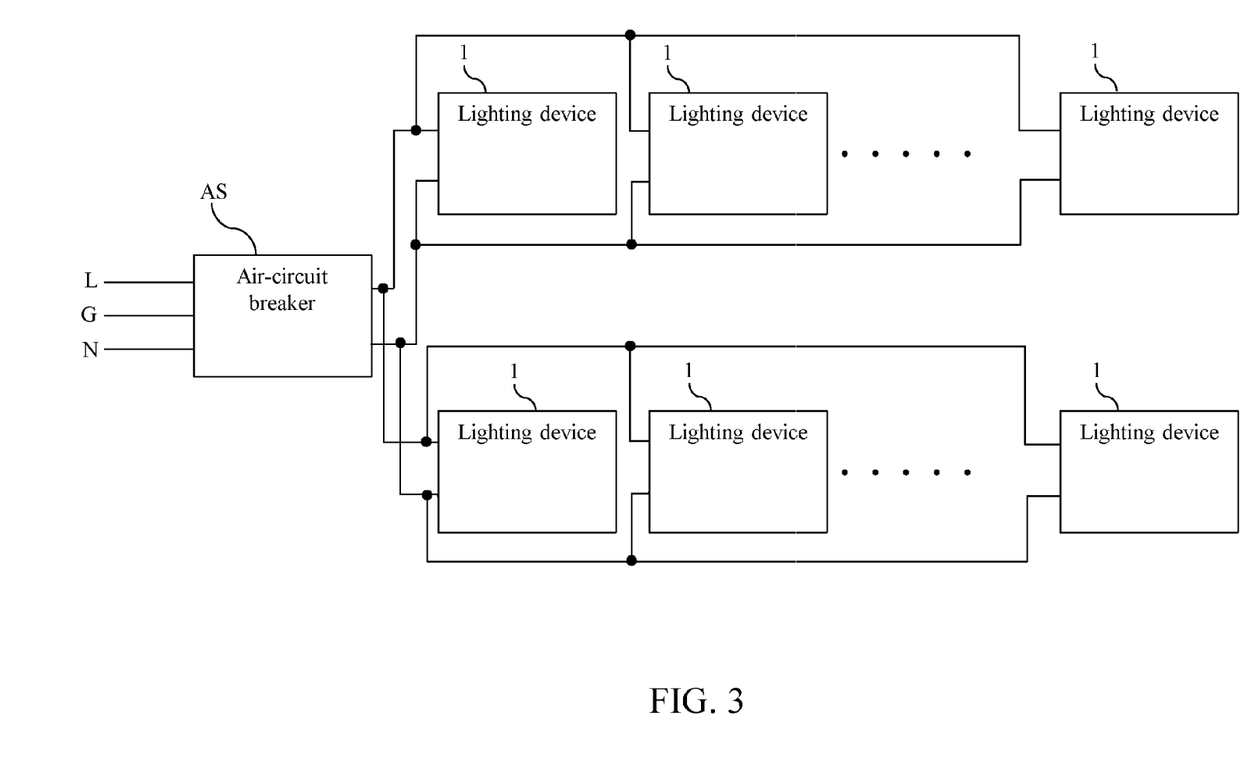
FIG. 3 is the schematic view the usage state of the lighting device having transient current suppressing function in accordance with the first embodiment of the present invention.

Please refer to FIG. 3, which is the schematic view the usage state of the lighting device having transient current suppressing function in accordance with the first embodiment of the present invention. As shown in FIG. 3, as shown in FIG. 3, multiple lighting devices 1 can be connected in series and connected to the air-circuit breaker AS (L stands for the live wire terminal of the air-circuit breaker AS; N stands for the neutral wire terminal of the air-circuit breaker AS; G stands for the ground terminal of the air-circuit breaker AS. The air-circuit breaker AS is connected to the external power source). The circuit design of this embodiment can effectively reduce the transient currents of each lighting device 1, so the air-circuit breaker AS can be connected to more lighting devices 1 in series. Therefore, the effectiveness of the air-circuit breaker AS can be maximized.

The embodiment just exemplifies the present invention and is not intended to limit the scope of the present invention; any equivalent modification and variation according to the spirit of the present invention is to be also included within the scope of the following claims and their equivalents.

Figure 4:
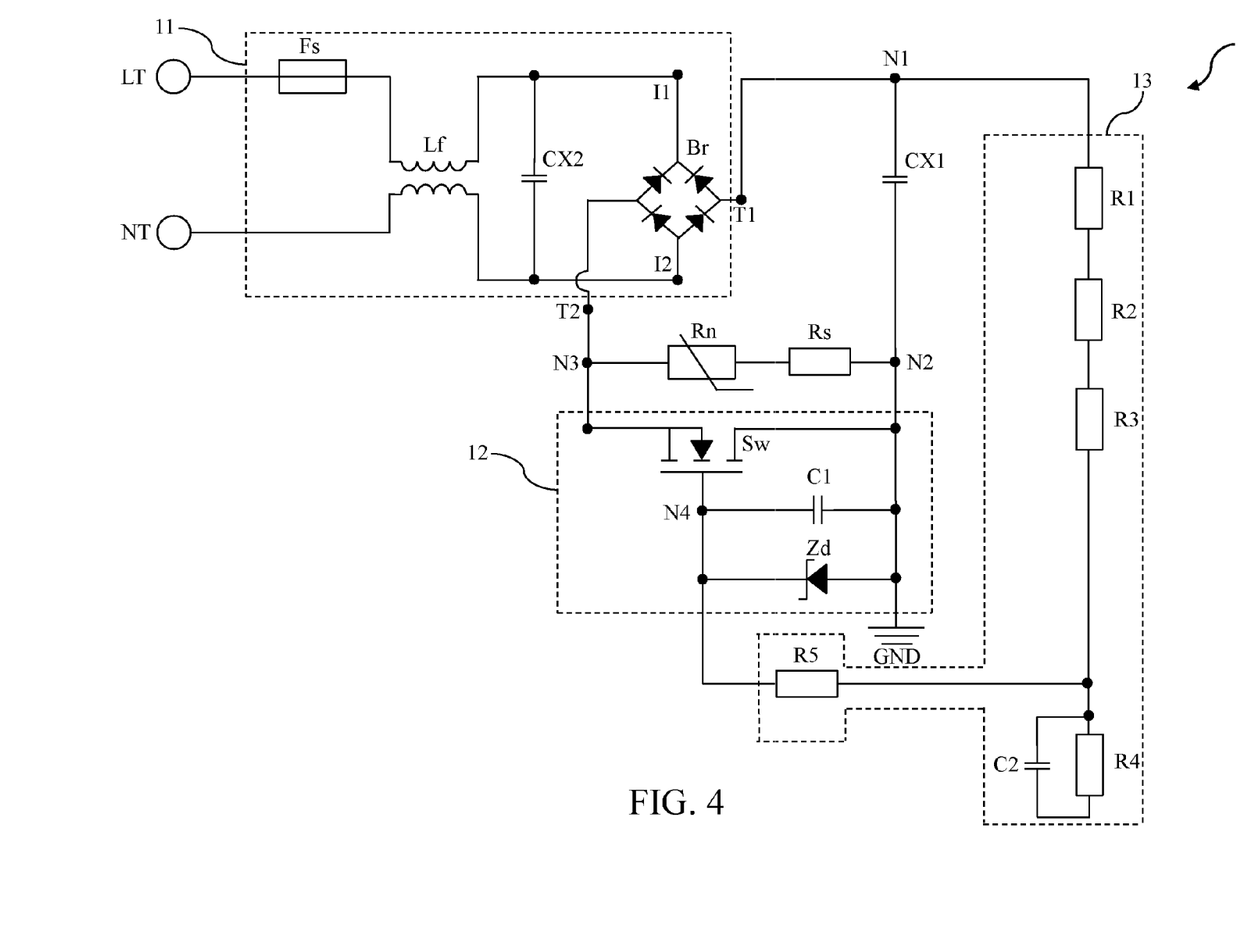
FIG. 4 is the circuit diagram of the lighting device having transient current suppressing function in accordance with the second embodiment of the present invention.

Please refer to FIG. 4, which is the circuit diagram of the lighting device having transient current suppressing function in accordance with the second embodiment of the present invention, and please also refer to FIG. 1. As shown in FIG. 1, the lighting device 1 includes the rectifying circuit 11, the first filtering capacitor CX1, the resistor element Rn, the transient current suppressing circuit 12, the voltage divider circuit 13, the voltage converting circuit 14, and the light source 15. FIG. 4 illustrates the circuit structures of the rectifying circuit 11, the transient current suppressing circuit 12, and the voltage divider circuit 13 of the lighting device 1, but the circuit structures of the rectifying circuit 11, the transient current suppressing circuit 12, and the voltage divider circuit 13 can be changed according to actual requirements. FIG. 4 also illustrates the connection relation of the rectifying circuit 11, the first filtering capacitor CX1, the resistor element Rn, the transient current suppressing circuit 12, and the voltage divider circuit 13.

The above components are similar to those of the previous embodiment, so they will not be described herein again. The difference from the previous embodiment is that the lighting device 1 of this embodiment also includes an auxiliary resistor Rs. One end of the resistor element Rn is connected to the second node N2 through the auxiliary resistor Rs, and the other end of the resistor element Rn is connected to the third node N3.

As set forth above, the lighting device 1 further includes the auxiliary resistor Rs. One end of the resistor element Rn is connected to the second node N2 through the auxiliary resistor Rs. The above auxiliary resistor Rs can effectively reduce the impact of environmental temperature on the resistor element Rn, such that the resistance of the resistor element Rn is less susceptible to environmental factors. The above circuit design can further enhance the transient current suppressing function. Therefore, the lighting device 1 is more flexible in use and can meet actual requirements.

Similarly, the above transient current suppressing circuit 12 and the operational mechanism thereof can effectively provide the transient current suppressing function. Therefore, the transient current of the lighting device 1 can be effectively reduced, so the air-circuit breaker can be connected to more lighting devices 1 in series. Consequently, the effectiveness of the air-circuit breaker can be maximized.

The embodiment just exemplifies the present invention and is not intended to limit the scope of the present invention; any equivalent modification and variation according to the spirit of the present invention is to be also included within the scope of the following claims and their equivalents.

It is worthy to point out that the transient currents of the currently available lighting devices cannot be effectively suppressed, so the effectiveness of air-circuit breakers cannot be maximized. On the contrary, according to one embodiment of the present invention, the lighting device having transient current suppressing function, which includes a rectifying circuit, a first filtering capacitor, a resistor element, a transient current suppressing circuit and a voltage divider circuit. One end of the first filtering capacitor is connected to a first node and the first node is connected to the first output end of the rectifying circuit. The other end of the first filtering capacitor is connected to a second node and the second node is connected to a grounding point. One end of the resistor element is connected to the second node and the other end of the resistor element is connected to a third node. The third node is connected to the second output end of the rectifying circuit. The transient current suppressing circuit includes a switch and a first adjusting capacitor. The first end of the switch is connected to a fourth node. The second end of the switch is connected to the second node. The third end of the switch is connected to the third node. One end of the first adjusting capacitor is connected to the second node and the other end of the first adjusting capacitor is connected to the fourth node. One end of the voltage divider circuit is connected to the first node and the other end of the voltage divider circuit is connected to the fourth node. The above transient current suppressing circuit operates by momentarily keeping the switch in the off state when the lighting device is connected to an external power source (air-circuit breaker is turned on). In this way, the resistor element can limit the current supplied to other circuit components in the lighting device. Thus, the transient current suppressing circuit can effectively achieve the transient current suppressing function. Once the transient current is effectively suppressed, the transient current suppressing circuit can control the switch to return to the on state and make the resistor element be in a short-circuit state. This ensures that the current supplied to other circuit components in the lighting device is not restricted by the resistor element. Consequently, transient currents in the lighting device can be significantly reduced, such that the air-circuit breaker can be connected in series with more lighting devices. As a result, the efficiency of the air-circuit breaker can be maximized.

Also, according to one embodiment of the present invention, the voltage divider circuit of the lighting device further includes a second adjusting capacitor, and the capacitance values of the first and second adjusting capacitors are related to the switch's turn-on delay time. Therefore, the voltage divider circuit of the lighting device also incorporates an auxiliary circuit that assist in transient current suppression. By adjusting the capacitance values of the first and second adjusting capacitors, the turn-on delay time of the switch can be effectively altered, which can enhance the transient current suppressing function. The circuit of the lighting device can achieve high stability.

Further, according to one embodiment of the present invention, the lighting device further includes an auxiliary resistor. One end of the resistor element connected to the second node via the auxiliary resistor. This auxiliary resistor effectively reduces the impact of environmental temperature on the resistor element, such that the resistance of the resistor element does not tend to change due to environmental factors. This circuit design further enhances the device can be more flexible in use and conform to actual requirements.

Moreover, according to one embodiment of the present invention, the lighting device can provide the effective transient current suppressing function and achieve high stability, such that the lighting device is applicable to various locations, such as factories, mines, and shopping malls. Consequently, the lighting device can be more comprehensively in application and satisfy different requirements.

Furthermore, according to one embodiment of the present invention, the circuit design of the lighting device is simple, so the lighting device can achieve the desired technical effects without significantly increasing the cost thereof. Therefore, the overall cost of the lighting device can be decreased, so the lighting device can achieve high practicality. As described above, the lighting device having transient current suppressing function according to the embodiments of the present invention can definitely achieve great technical effects.

Figure 5:
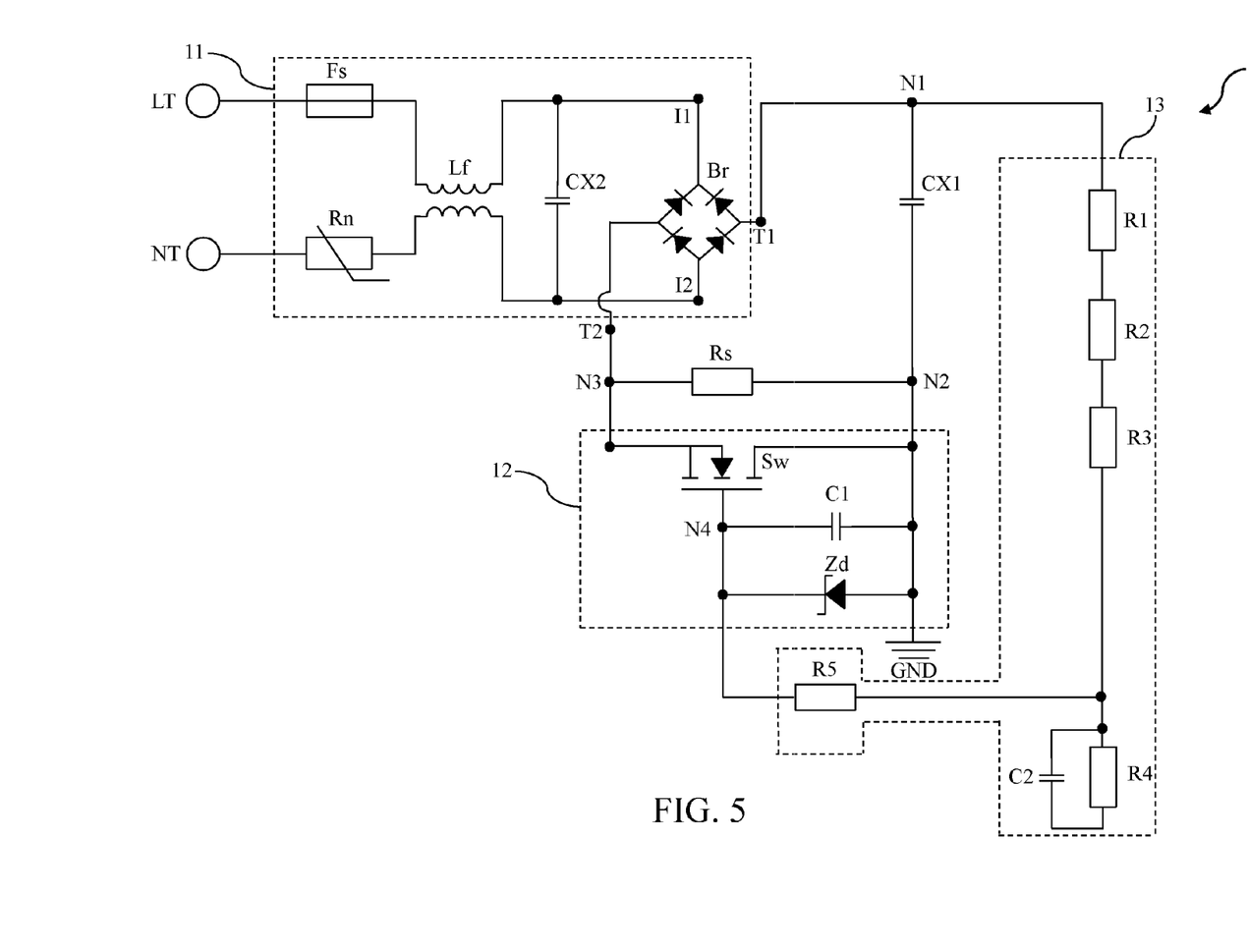
FIG. 5 is the circuit diagram of the lighting device having transient current suppressing function in accordance with the third embodiment of the present invention.

Please refer to FIG. 5, which is the circuit diagram of the lighting device having transient current suppressing function in accordance with the third embodiment of the present invention, and please also refer to FIG. 1. As shown in FIG. 1, the lighting device 1 includes the rectifying circuit 11, the first filtering capacitor CX1, the resistor element Rn, the transient current suppressing circuit 12, the voltage divider circuit 13, the voltage converting circuit 14, and the light source 15. FIG. 5 illustrates the circuit structures of the rectifying circuit 11, the transient current suppressing circuit 12, and the voltage divider circuit 13 of the lighting device 1, but the circuit structures of the rectifying circuit 11, the transient current suppressing circuit 12, and the voltage divider circuit 13 can be changed according to actual requirements. FIG. 5 also illustrates the connection relation of the rectifying circuit 11, the first filtering capacitor CX1, the resistor element Rn, the transient current suppressing circuit 12, and the voltage divider circuit 13.

The above components are similar to those of the previous embodiment, so they will not be described herein again. The difference from the previous embodiment is that one end of the auxiliary resistor Rs is connected to the second node N2, and the other end of the auxiliary resistor Rs is connected to the third node N3. Additionally, the resistor element Rn is disposed between the other input end of the common-mode inductor Lf and the neutral wire terminal NT. This circuit design can achieve the same technical effects of the first and second embodiments mentioned above.

To sum up, according to one embodiment of the present invention, the lighting device having transient current suppressing function, which includes a rectifying circuit, a first filtering capacitor, a resistor element, a transient current suppressing circuit and a voltage divider circuit. One end of the first filtering capacitor is connected to a first node and the first node is connected to the first output end of the rectifying circuit. The other end of the first filtering capacitor is connected to a second node and the second node is connected to a grounding point. One end of the resistor element is connected to the second node and the other end of the resistor element is connected to a third node. The third node is connected to the second output end of the rectifying circuit. The transient current suppressing circuit includes a switch and a first adjusting capacitor. The first end of the switch is connected to a fourth node. The second end of the switch is connected to the second node. The third end of the switch is connected to the third node. One end of the first adjusting capacitor is connected to the second node and the other end of the first adjusting capacitor is connected to the fourth node. One end of the voltage divider circuit is connected to the first node and the other end of the voltage divider circuit is connected to the fourth node. The above transient current suppressing circuit operates by momentarily keeping the switch in the off state when the lighting device is connected to an external power source (air-circuit breaker is turned on). In this way, the resistor element can limit the current supplied to other circuit components in the lighting device. Thus, the transient current suppressing circuit can effectively achieve the transient current suppressing function. Once the transient current is effectively suppressed, the transient current suppressing circuit can control the switch to return to the on state and make the resistor element be in a short-circuit state. This ensures that the current supplied to other circuit components in the lighting device is not restricted by the resistor element. Consequently, transient currents in the lighting device can be significantly reduced, such that the air-circuit breaker can be connected in series with more lighting devices. As a result, the efficiency of the air-circuit breaker can be maximized.

Also, according to one embodiment of the present invention, the voltage divider circuit of the lighting device further includes a second adjusting capacitor, and the capacitance values of the first and second adjusting capacitors are related to the switch's turn-on delay time. Therefore, the voltage divider circuit of the lighting device also incorporates an auxiliary circuit that assist in transient current suppression. By adjusting the capacitance values of the first and second adjusting capacitors, the turn-on delay time of the switch can be effectively altered, which can enhance the transient current suppressing function. The circuit of the lighting device can achieve high stability.

Further, according to one embodiment of the present invention, the lighting device further includes an auxiliary resistor. One end of the resistor element connected to the second node via the auxiliary resistor. This auxiliary resistor effectively reduces the impact of environmental temperature on the resistor element, such that the resistance of the resistor element does not tend to change due to environmental factors. This circuit design further enhances the device can be more flexible in use and conform to actual requirements.

Moreover, according to one embodiment of the present invention, the lighting device can provide the effective transient current suppressing function and achieve high stability, such that the lighting device is applicable to various locations, such as factories, mines, and shopping malls. Consequently, the lighting device can be more comprehensively in application and satisfy different requirements.

Furthermore, according to one embodiment of the present invention, the circuit design of the lighting device is simple, so the lighting device can achieve the desired technical effects without significantly increasing the cost thereof. Therefore, the overall cost of the lighting device can be decreased, so the lighting device can achieve high practicality.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lighting device having transient current suppressing function, comprising:
   a rectifying circuit;
   a first filtering capacitor, wherein one end of the first filtering capacitor is connected to a first node and the first node is connected to a first output end of the rectifying circuit, and another end of the first filtering capacitor is connected to a second node and the second node is connected to a grounding point;
   a resistor element, wherein one end of the resistor element is connected to the second node and another end of the resistor element is connected to a third node, and the third node is connected to a second output end of the rectifying circuit;
   a transient current suppressing circuit comprising a switch and a first adjusting capacitor, wherein a first end of the switch is connected to a fourth node, a second end of the switch is connected to the second node, a third end of the switch is connected to the third node, wherein one end of the first adjusting capacitor is connected to the second node and another end of the first adjusting capacitor is connected to the fourth node; and
   a voltage divider circuit, wherein one end of the voltage divider circuit is connected to the first node and another end of the voltage divider circuit is connected to the fourth node;
   wherein the transient current suppressing circuit momentarily keeps the switch in an off state at a moment of the rectifying circuit being connected to an external power source, and a current supplied to the lighting device is limited by the resistor element, whereby a transient current is suppressed, wherein when the transient current is suppressed, the transient current suppressing circuit controls the switch to return to an on state to make the resistor element be in a short-circuit state, whereby the current supplied to the lighting device is not restricted by the resistor element.

2. The lighting device having transient current suppressing function as claimed in claim 1, wherein a capacitance of the first adjusting capacitor is related to a turn-on delay time of the switch, and the turn-on delay time of the switch is 10 ms to 100 ms.

3. The lighting device having transient current suppressing function as claimed in claim 1, wherein the transient current suppressing circuit further comprises a Zener diode, wherein one end of the Zener diode is connected to the second node and another end of the Zener diode is connected to the fourth node.

4. The lighting device having transient current suppressing function as claimed in claim 1, further comprising an auxiliary resistor, wherein one end of the resistor element is connected to the second node via the auxiliary resistor.

5. The lighting device having transient current suppressing function as claimed in claim 1, wherein the voltage divider circuit comprises a first resistor group and a second resistor group, wherein one end of the first resistor group is connected to the first node, and another end of the first resistor group is connected to the fourth node and the second resistor group.

6. The lighting device having transient current suppressing function as claimed in claim 5, wherein the voltage divider circuit further comprises a second adjusting capacitor and a fifth resistor, wherein the second adjusting capacitor is connected to the second resistor group in parallel, and another end of the first resistor group is connected to the fourth node via the fifth resistor.

7. The lighting device having transient current suppressing function as claimed in claim 6, wherein a capacitance of the second adjusting capacitor is related to a turn-on delay time of the switch.

8. The lighting device having transient current suppressing function as claimed in claim 1, wherein the switch is a metal-oxide-semiconductor field-effect transistor or a bipolar junction transistor.

9. The lighting device having transient current suppressing function as claimed in claim 1, wherein the resistor element is a thermistor, a cement resistor or a carbon-film resistor.

* * * * *